(12) United States Patent
Dupont et al.

(10) Patent No.: US 6,351,829 B1
(45) Date of Patent: Feb. 26, 2002

(54) SYSTEM AND METHOD FOR DISTINGUISHING A DEVICE FAILURE FROM AN INTER-DEVICE COMMUNICATION FAILURE

(75) Inventors: Anthony J. Dupont, Greenville, WI (US); Paul A. Payne, Denver, PA (US)

(73) Assignee: Honeywell INC, Morristown, NJ (US)

( * ) Notice: Subject to any disclaimer, the term of this patent is extended or adjusted under 35 U.S.C. 154(b) by 0 days.

(21) Appl. No.: 09/181,095

(22) Filed: Oct. 28, 1998

(51) Int. Cl.[7] .................................................. H02H 3/05
(52) U.S. Cl. .......................................... 714/48; 714/11
(58) Field of Search ............................... 714/48, 11, 12, 714/13, 14

(56) References Cited

U.S. PATENT DOCUMENTS

| 4,463,339 | A | * | 7/1984 | Frick et al. .................. 340/906 |
| 4,819,225 | A | * | 4/1989 | Hochstein .................... 370/216 |
| 4,823,256 | A | * | 4/1989 | Bishop et al. ................. 714/10 |
| 4,872,106 | A | * | 10/1989 | Slater |
| 4,926,281 | A | * | 5/1990 | Murphy ........................ 361/55 |
| 5,034,966 | A | * | 7/1991 | Hochstein .................... 375/267 |
| 5,091,847 | A | * | 2/1992 | Herbermann .................. 714/3 |
| 5,099,485 | A | * | 3/1992 | Bruckert et al. .............. 714/11 |
| 5,790,397 | A | * | 8/1998 | Bissett et al. ................ 364/131 |
| 5,896,391 | A | * | 4/1999 | Solheim et al. ............. 714/704 |
| 5,975,738 | A | * | 11/1999 | DeKoning et al. .......... 364/184 |
| 6,148,415 | A | * | 11/2000 | Kobayashi et al. ........... 714/15 |

* cited by examiner

Primary Examiner—Dieu-Minh Le
(74) Attorney, Agent, or Firm—Hitt Gaines & Boisbrun (57) ABSTRACT

For use in a control system containing first and second devices coupled together for inter-device communication, a circuit for and method of distinguishing a failure of the first device from a failure of the inter-device communication and a real-time process control system employing the circuit or the method. In one embodiment, the circuit includes: (1) a device failure signal generator, associated with and separately powered from the first device, that communicates a device failure signal to the second device upon occurrence of a predetermined condition and (2) a device failure signal detector, associated with the second device, that detects the device failure signal. Detection of the device failure signal contraindicates a failure of the inter-device communication.

20 Claims, 3 Drawing Sheets

SYSTEM AND METHOD FOR DISTINGUISHING A DEVICE FAILURE FROM AN INTER-DEVICE COMMUNICATION FAILURE

TECHNICAL FIELD OF THE INVENTION

The present invention is directed, in general, to computing and processing systems and, more specifically, to systems and methods for distinguishing a device failure from a failure to communicate with the device.

BACKGROUND OF THE INVENTION

Automated plant control systems include a comprehensive set of algorithms, or software-definable process control routines, to control and monitor various processes within, for instance, a manufacturing facility. The control systems can be tailored to satisfy a wide range of process requirements globally or within specified portions of the facility. Conventionally, the control systems include a variety of modules, each having its own processor and firmware, linked together by communication buses to result in a distributed process control system. The distributed nature of the system affords high performance with the capability to expand the system incrementally to satisfy growth or modifications in the facility.

In a real-time process control system, processing can be distributed in such a manner where there exists two controllers coupled together paralleling the same operation. Because the same operation or process is paralleled, these controllers are referred to as "dual redundant process controllers." Dual redundant process controllers operate in such a manner that one of the controllers (designated the "primary controller") is always in a lead state (meaning that it has actual control of all or part of the system). The other process controller (the "secondary controller") mirrors the primary controller's processes but is not in actual control of the system. In effect, the secondary controller parallels the lead controller in all aspects of operation and data storage and remains ready to take over from the primary controller should the primary controller fail. If such a failure occurs in the primary controller, the operation of actual control ("lead state") of that part or all of the system should be assumed by the secondary controller. When the secondary controller asserts the lead state, the primary controller can no longer operate in the lead state and the secondary controller then becomes the primary controller for that part or all of the real-time process system.

Normally, each of the dual redundant process controllers contains a processor and firmware and is linked to the overall system. The processor could be, for example one of the i960Hx series of superscalar RISC processors commercially available from the Intel Corporation. The processor usually resides on a local bus which also includes local random access memory ("RAM"), memory for program storage, and hardware for monitoring and controlling external functions. Firmware is a computer program contained persistently in a read-only memory ("ROM") associated with the processor. The primary activity of the local bus is control and management of the controller through firmware execution by the central processing unit ("CPU"). Additionally, the primary and secondary controllers are normally interconnected with each other in some manner of circuitry like coaxial or fiber optic cable. This inter-connectivity between dual redundant process controllers allows the controllers to communicate operational states, and keep mirror-image activity of the lead state controller communicated to the secondary controller along with any information in the form of data that should be stored on the secondary controller.

The fundamental and critical requirement of real-time process systems using dual redundant process controllers is the singularity of operation for the lead-state controller over at least that part of the system it is to control. One and only one of the dual redundant controllers can be in actual control (have the lead state) of all or part of the system at any time. If lead-state singularity is not preserved, the processing system could encounter dual commands from the primary and secondary controllers that would be competing and/or conflicting, which could lead to a system lock up, overload, shut down, or other devastating process-system type failure. In large manufacturing facilities or plants, a failure of a process controller could be very costly in many ways including down-time for equipment and manpower, probable loss or destruction of raw materials, and the subsequent expense of restarting the process. In fact, the avoidance of such a devastating system failure is so important that it becomes the basis for the conceptualization of redundant controllers. And the absorption of the additional costs of having redundant controllers are now a necessary consideration rather than an exception.

Because the criticality exists for lead-state singularity for dual redundant process controllers, the dependency on the reliability of inter-connectivity of communications between the dual redundant process controllers is paramount. The primary and secondary controllers must be able to intelligently transition the lead-state control from the primary controller to the secondary controller timely and effectively in the event of a failure of the primary controller, allowing the process system to continue without any interruption or at least as minimal an interruption as possible.

A problem that arises from the critical nature of the singularity of operation of the lead-state controller, is the ability of the secondary controller to correctly determine when to assert the lead state. As previously discussed, it is paramount for process-system integrity that the secondary controller correctly determine when to assert lead-state control. Failure scenarios can be of more than one type and may or may not create the necessity for the secondary controller to assert lead-state control.

If the failure is an inter-controller communications failure, as in a connector cable break, the primary controller remains viable and should remain in the lead state. The secondary controller should be intelligent enough to know that no requirement nor attempt to assert control responsibility is necessary because the primary controller has not had a failure occur. On the other hand, if a device failure occurs in the primary controller, the necessary requirement exists for the secondary controller to know that the partner device failure has occurred and to immediately activate and assert the lead state. And for both failure scenarios, there is always the basic requirement to ensure the two controllers are not colliding while attempting to control the system. Without the ability for the secondary controller to distinguish between a device failure from a failure to communicate with the partner device, lead-state control could be asserted by the secondary controller and possibly compromise the lead-state singularity of the dual controllers, jeopardizing process system integrity.

Ideally, if the secondary controller could know that a device failure has occurred, a transition from the primary controller to the secondary controller could be determinatively effected, thereby preserving system integrity. Thus, it is advantageous that the secondary controller have the ability to assess the difference between a device failure in the primary controller and that of a communications link failure from the inter-connectivity of the two controllers.

Previous attempts have been made to accomplish the task of inter-connectivity reliability and distinguishing failure scenarios between controllers by adding hardware to establish alternate communication paths. By allowing alternate communication paths, it was thought the solution had been achieved. But other problems came to light with the additional hardware including increased cost of additional devices, added complexity and a possible degradation of reliability that the additional hardware created with new and possible undetectable failure scenarios for the controllers. In effect, the solution that was being provided actually introduced more problems than it solved and could defeat its intended purpose.

Another problem that has been encountered in effectively transitioning lead-state control is the ability of the primary controller to report to the secondary controller its device failure during sudden power loss. Reporting between the controllers should occur even during sudden failure. Even with a sudden-power device failure in the primary controller, enough power should exist for the primary controller to send the critical failure notification and allow the secondary controller to have enough time to respond and assert itself as lead-state controller. Under sudden power loss conditions, sometimes the hardware loses power within several microseconds.

Attempts have been made to address the sudden-power device failure problem also by way of alternate communication paths and/or through default states as in existing Honeywell equipment, but the biggest shortcoming of the previous methods, besides the need for additional hardware, is the time that is needed to detect and respond to such a failure. Current methods require hundreds of microseconds or longer to recognize and address the sudden-power device failure problem. Although such a time period may seem minuscule to most people, that length of time for a real-time processing system in a manufacturing facility could seriously or fatally impact the whole process system.

If within a few microseconds, the primary controller could detect and report a device failure to the secondary controller; the secondary controller could receive and assess the failure notification; the secondary controller could subsequently effectively respond by asserting the lead state, while preserving lead-state singularity; and such lead-state transition could be accomplished without the need for additional inter-device hardware, the dual redundant process controllers' efficiency and reliability would be enhanced, and the process system's integrity would be better preserved. Further the manufacturing and/or processing plant industry could take advantage of a more reliable, and cost efficient system of dual redundant process controllers.

Therefore, what is needed in the art is a more reliable, efficient, and cost effective way for dual redundant real-time process controllers to discriminate intelligently between intercontroller failure modes in a distributive control system to avoid the significant impact of plant process impairment.

SUMMARY OF THE INVENTION

To address the above-discussed deficiencies of the prior art, it is a primary object of the present invention to provide a positive way to distinguish device failures from inter-device communication failures.

In the attainment of the above primary object, the present invention provides, for use in a control system containing first and second devices coupled together for inter-device communication, a circuit for and method of distinguishing a failure of the first device from a failure of the inter-device communication and a real-time process control system employing the circuit or the method. In one embodiment, the circuit includes: (1) a device failure signal generator, associated with and separately powered from the first device, that communicates a device failure signal to the second device upon occurrence of a predetermined condition and (2) a device failure signal detector, associated with the second device, that detects the device failure signal, detection of the device failure signal contraindicating a failure of the inter-device communication.

The present invention therefore introduces the broad concept of affirmatively initiating inter-device communication upon occurrence of a predetermined condition (to be explained below) to, in effect, test the inter-device communication. If the second device receives a device failure signal, it can assume that inter-device communication is intact. In many cases, the second device can further assume that the first device has failed.

The ability to discriminate between device failures and inter-device communication failures is particularly advantageous when the first and second devices are primary and secondary controllers in the control system. Therefore, in one embodiment of the present invention, the first and second devices are primary and secondary controllers of the control system, respectively. Of course, the first device may be a sensor, a controllable device or other piece of equipment in the control system. The present invention is advantageously employable to distinguish failure modes from one another in a wide variety of applications.

In one embodiment of the present invention, the predetermined condition is a loss of power to the first device. Alternatively, the predetermined condition may be receipt of a software command (thereby allowing the device failure signal generator and detector to be tested). Those skilled in the art may readily perceive other conditions under which the device failure signal generator may be prompted to operate.

In one embodiment of the present invention, the device failure signal contains a predetermined data pattern. In an embodiment to be illustrated and described, the predetermined data pattern repeats, allowing the device failure signal detector affirmatively to recognize the pattern and thereby distinguish the pattern from noise. Of course, the device failure signal may be any signal whatsoever, and does not need to carry data.

In one embodiment of the present invention, the device failure signal generator is powered by a power supply that derives power from a power supply of the first device. In the embodiment to be illustrated and described, the first device is contained in a module in a rack centrally-powered by a main power supply and the device failure signal generator is co-located in the module. If the first device is dislodged in the rack such that it loses power, the power supply for the device failure signal generator likewise loses power, but has enough residual hold-up capacity to power the generator for a period of time sufficient to allow the device failure signal detector to receive and recognize the device failure signal.

In one embodiment of the present invention, the inter-device communication occurs over a selected one of: (1) an electrical conductor and (2) an optical fiber. Those skilled in the art will recognize, however, that the device failure signal can be communicated from the first device to the second device over any one of a wide variety of physical media.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like numbers designate like parts, and in which.

DETAILED DESCRIPTION

Figures 1, 2:
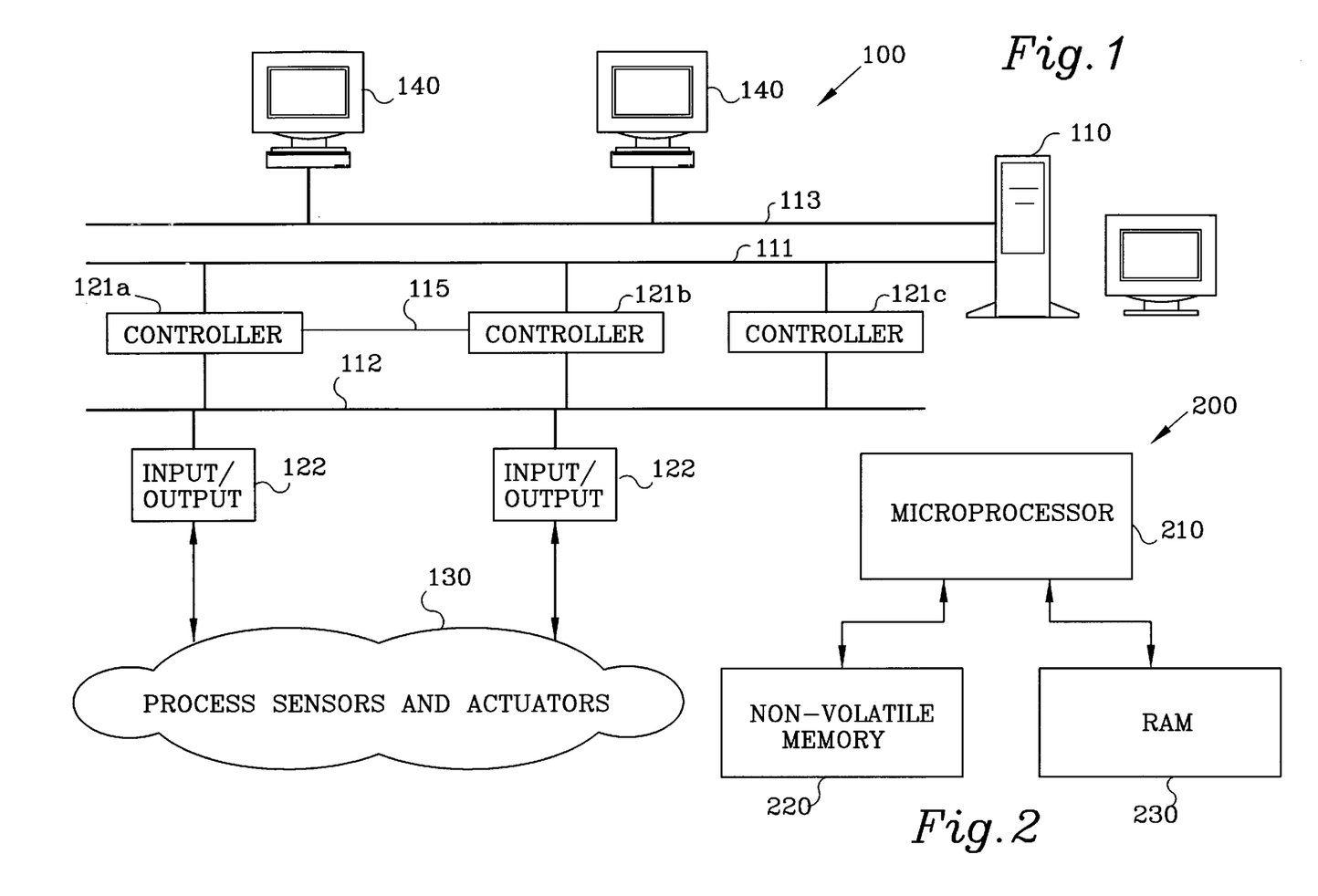
FIG. 1 illustrates a functional diagram of an exemplary distributed, real-time process control system with which the present invention may suitably be used.
FIG. 2 illustrates a high-level block diagram of an exemplary digital processing system that may be employed to execute software-definable process control routines embodying the principles of the present invention.

Before undertaking a description of the exemplary embodiments of the systems and methods of the present invention, it is helpful to describe a computing or processing system environment in which the present invention may suitably be used or implemented. Referring initially to FIG. 1, illustrated is a functional diagram of an exemplary distributed, real-time process control system (generally designated 100) with which the present invention may suitably be used.

The process control system 100 illustratively includes a computer network having a server 110 and a controller network 111. Those skilled in the art are familiar with various types of computer networks and servers. The principles of the present invention are not limited to a specific process control system or type of computer network or server, but may readily be employed to advantage any such system. The controller network 111 provides an interface between the server 110 and the process controllers 121a, 121b, 121c. Of the process controllers, two process controllers 121a, 121b operate as dual redundant process controllers wherein the process controller 121a is designated as a primary controller and the process controller 121b is designated as a secondary controller. The dual redundant process controllers 121a, 121b are interconnected by communications circuitry 115. The normal function of the dual redundant process controllers allows the primary controller 121a to maintain actual control (lead state) within the distributed, real-time process control system 100 while the secondary controller 121b parallels the processes of the primary controller 121a. The secondary controller 121b has all the capabilities of the primary controller 121a it mirrors. The secondary controller 121b is not in actual control of part or all of the distributed, real-time process control system 100 unless and until the primary controller 121a has a device failure and the secondary controller 121b asserts the lead state. In such an instance, the primary controller 121a no longer operates with the process control system 100 as a primary controller and the secondary controller 121b has established itself as the new primary controller for that part or all of the process control system 100.

The third controller 121c is not part of the dual redundant process controller environment of 121a, 121b, 115, but is part of the overall controller network and is completely independent of 121a, 121b and in its separate capacity considered to be another primary process controller on the controller network 111. The controller network 111 may, for example, carry supervisory messages between the server 110 and primary process controllers 121a and 121c and peer-to-peer messages between the primary process controllers 121a, 121c.

The primary process controllers 121a, 121c communicate with input/output ("I/O") devices (generally designated 122) via an I/O network 112. The process controllers 121 are adapted to execute software-definable process control routines for controlling and receiving data from the process sensors and actuators 130 via the I/O devices 122 and the I/O network 112. Those skilled in the art are familiar with various types of process sensors and actuators 130, such as electrically-controllable motors, valves or pumps, that may be employed in the manufacture of sundry products. The principles of the present invention are not limited to a specific process or processing system, however, but may readily be employed to advantage in any such system.

In one embodiment, the process control system 100 further includes a local area network ("LAN") 113 that provides an interface between the server 110 and remote workstations (generally designated 140). The remote workstations 140 may be used by system operators to control and monitor the operation of the process control system 100.

Although illustrated as a separate network, the LAN 113 and controller network 111 may be the same; i.e., the remote workstations 140 and the process controllers 121a, 121b, 121c may share the same network transmission medium. Those skilled in the art will recognize, however, that providing separate networks for control systems and operator workstations may enhance the reliability of a distributed, real-time process control system, e.g., network traffic on the LAN 113 associated with distributing process-related data from the server 110 to the operator workstations 140 does not interfere with process control information transmitted between the server 110 and the process controllers 121a or 121c via the control network 111.

Software-definable process control routines may be executed by any digital processing system, such as the server 110, the workstations 140, or one or more of the process controllers 121a, 121b, 121c.

Turning now to FIG. 2, illustrated is a high-level block diagram of an exemplary digital processing system (generally designated 200) that may be employed to execute software-definable process control routines embodying the principles of the present invention. The exemplary digital processing system 200 includes a microprocessor 210, a non-volatile memory 220, and a random access memory (RAM) 230. The non-volatile memory 220, which is employed to store software-definable process control routines, may comprise, for example, a programmable ROM (PROM), flash ROM or a nonvolatile magnetic storage medium.

The software-definable process control routines stored in the non-volatile memory 220 are executed by the microprocessor 210. The microprocessor 210 employs the RAM 230 to store all or portions of the process control routines as the routines are executed, as well as storage for process control data associated with the process sensors and actuators 130. The description of the exemplary digital processing system 200 is merely illustrative. Those skilled in the art will recognize that software-definable process control routines employing the principles of the present invention are not limited to a specific hardware implementation for digital processing system 200, and that all such systems are within the broad scope of the present invention.

The present invention is illustrated as being embodied in a set of dual redundant process controllers 121a, 121b and the communications circuitry 115 that connects them. One of the controllers designated the primary controller has the lead state (actual control) of the process system while the secondary controller acts as its mirror and remains ready as backup controller to assert the lead state in the event of the failure of the primary controller.

Figure 3:
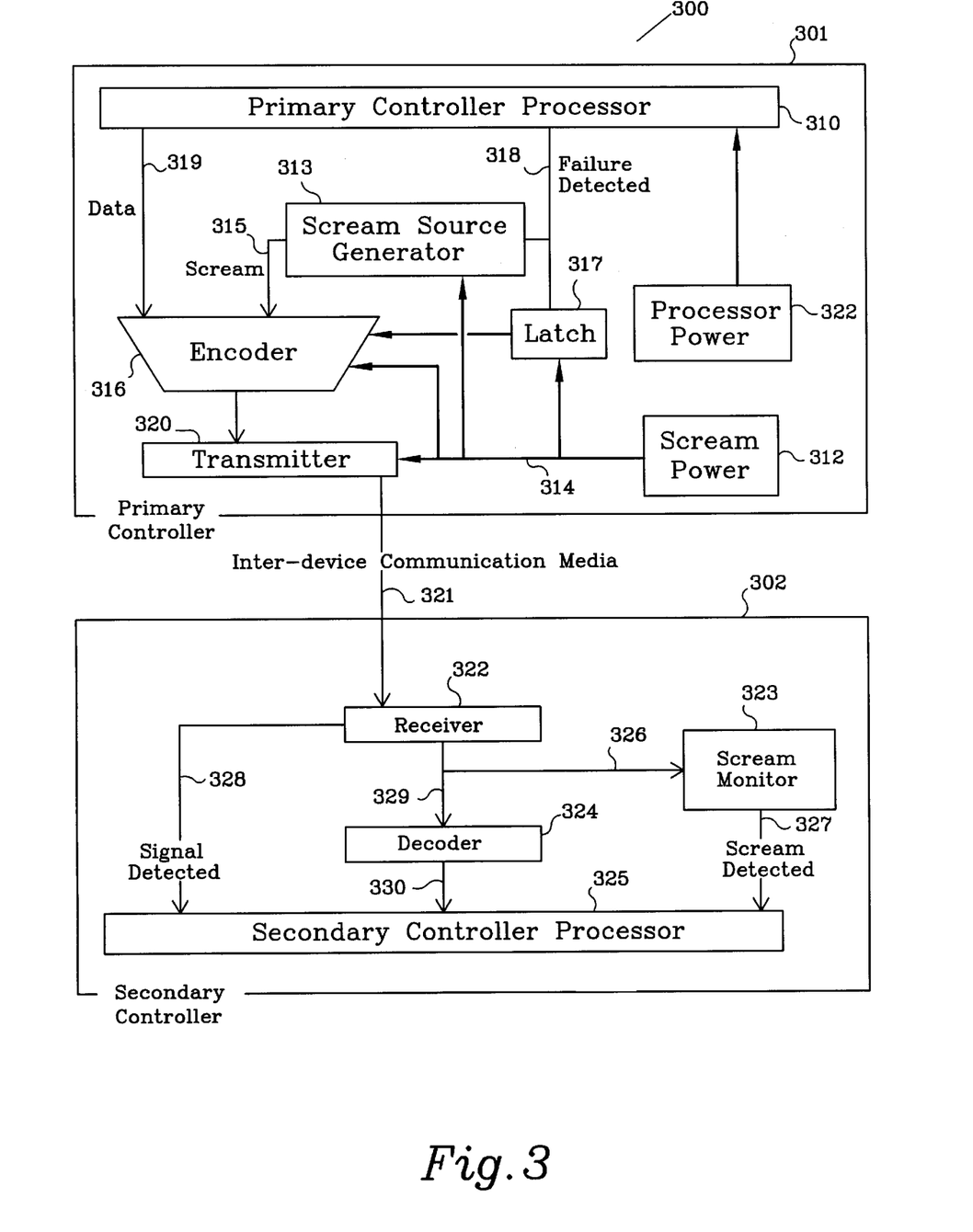
FIG. 3 illustrates a functional diagram of one embodiment of a system capable of distinguishing a device failure of a primary controller in a distributed, real-time process control environment with dual redundant interconnected process controllers, one being a primary controller and the other a secondary controller.

Turning now to FIG. 3, illustrated is a functional diagram of one embodiment of a system (generally designated 300) capable of distinguishing a device failure of a primary controller in a distributed, real-time process control environment with dual redundant interconnected process controllers. In a distributed, real-time process control system 100, exemplary dual redundant process controllers may exist where one device is a primary controller 301 and the other a secondary controller 302 and wherein the primary controller 301 and the secondary controller 302 are interconnected by medium/media 321, such as coaxial or fiber optic cable. The primary controller 301 can generate and communicate a failure notification to the secondary controller 302 through the inter-device communications media 321. The secondary controller 302 then can receive through the inter-device communications media 321 transmission and interpret the failure notification from the primary controller 301 and if necessary, assert the lead-state control as primary controller for that part or all of the real-time process control system.

In FIG. 3, it should be noted that only components facilitating communication from the primary controller 301 to the secondary controller 302 are shown, however, the components may be duplicated in the opposite direction, such that the same communications components may be supported by the other device.

The primary controller 301 contains a processor 310, which may be a RISC processor and/or any other system hardware (having microprocessor supervisor logic) not restricted to a processor. FIG. 3 illustrates a primary controller processor power source 311 which will be able to suitably power the primary controller 301 and especially for components in the primary controller processor 310. A scream source generator 313 detects a predetermined device failure condition and generates a failure notification, henceforth referred to as a "scream." The primary controller scream power supply 312 is illustrated as being separate and independent from the primary controller processor power source 311. The primary controller scream power supply 312 is isolated from the primary controller processor power 311 to ensure the scream source generator 313 can generate and emit information to the secondary controller 302 in the event of a sudden loss of the primary controller processor power 311. Although it is possible that the processor power supply 311 and the scream power supply 312 may be the same, it is important to note that a scream power supply must sustain power long enough for a valid scream to be generated and transmitted via the interconnected media 321 to the secondary controller 302. In FIG. 3, the scream power supply 312 advantageously has sufficient hold up time, after its power source is lost, to allow the scream source generator 313 to generate enough repetitions of the scream 315 to allow the secondary controller scream monitor 323 to recognize a valid scream. Additionally, the scream power supply 312 can separately provide power 314 for a number of components in the primary controller 301 that are responsible for the critical failure notification to the partner secondary controller 302 and may include the scream source generator 313, the encoder 316, the latch 317 and the transmitter 320 and may, for example, be an isolated +5 volt DC power supply that continues to supply power to the notification logic hardware for several additional milliseconds to generate the scream 315.

In the event of the primary controller device failure condition, the primary controller scream source generator 313, produces the scream 315, a unique information pattern that is transmitted to the encoder 316. The scream information pattern is such that it will not be confused with normal data patterns by employing data characters that differ completely from random, non-scream data patterns. In addition to the scream information pattern 315, the encoder 316 also receives normal data 319 from the primary controller processor 310. If a device failure is detected, a device failure signal 318 may be sent through the latch 317 to the encoder 316. The latch 317 represents the encoder's ability to sustain the encoding of the scream 315 even after the failure detected signal 318 disappears when the primary controller processor 310 loses its power. The encoder 316, using the failure detected signal 318 through the latch 317, selects normal data 319 or scream information 315 and encodes the selection into a form suitable for the transmitter 320. The transmitter 320 converts the encoded information from the encoder 316 to a media-compatible signal and transmits the encoded information from the encoder 316 to the secondary controller 302 through the inter-device communications media 321.

The secondary controller 302 then receives the signal from the inter-device communications media 321 through the receiver 322. The secondary controller 302 also contains a processor 325 that may be a RISC processor. The secondary controller receiver 322 converts the media compatible signals into the encoded information 329 for the decoder 324 to decode. The secondary controller receiver 322 additionally provides a signal detector for the secondary controller processor 325 to know that a signal detected 328 was received from the primary controller 301. The decoder 324 decodes the encoded information sent from the primary controller 301. The decoded data 330 is then sent to the secondary controller processor 325 for its normal processing. The decoder 324 could both support or provide the signal detect 328 process.

The scream monitor 323 also monitors the receiver output 326 looking for sustained scream information. Sustained scream information means a series of continuous repetitions of the scream information pattern 315. The repetitions could be for instance, ten repetitions of the scream information pattern 315. The scream monitor 323 could also be a part or component of the decoder 324. The scream monitor 323 can store any predetermined valid scream information pattern 315 to eliminate any need for the primary controller scream source generator 313 to sustain operation after a valid scream is emitted from the primary controller 301.

In the illustrated embodiment, the secondary controller scream monitor 323 considered a scream valid if a predefined set of unique scream characters generated by the primary controller scream source generator 313 are recognized, sustained, repeated and follow a predetermined pattern sequence for a predetermined period of time. The scream monitor 323 recognizes the sustained predefined scream pattern 315 for a predetermined period of time and is able to distinguish the scream information pattern 315 from random noise on the inter-device communications media 321 link. Once the primary controller scream information pattern 315 has been validated by the secondary controller scream monitor 323, the scream detected information 327 is passed to the secondary controller processor 325 for the secondary controller processor 325 to assert lead-state control over that part or all of the process system.

Having considered the physical and functional principles of the dual redundant process controllers and the generation, transmission, receipt and detection of a valid scream sequence between such controllers, it now comes time to consider how the scream is generated by the primary controller 301 and subsequently interpreted by the secondary controller 302.

Figure 4A:
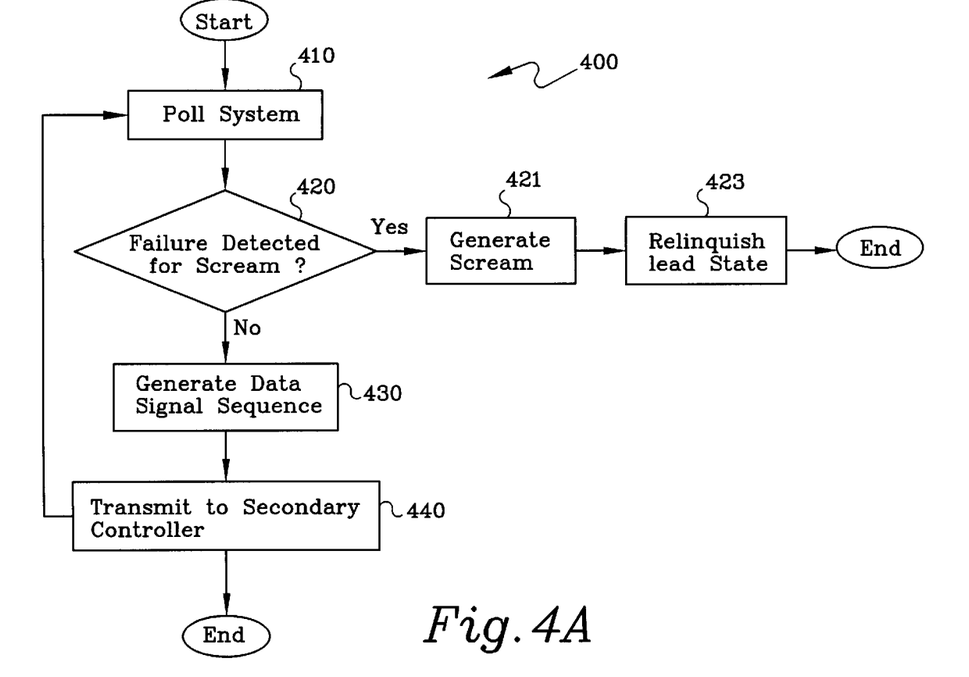
FIG. 4A illustrates a flow block diagram of one embodiment of an exemplary method of a failure notification signal generation by a primary controller through firmware routines and transmission through the inter-connectivity of the dual redundant controllers such failure to the secondary controller.
Figure 4B:
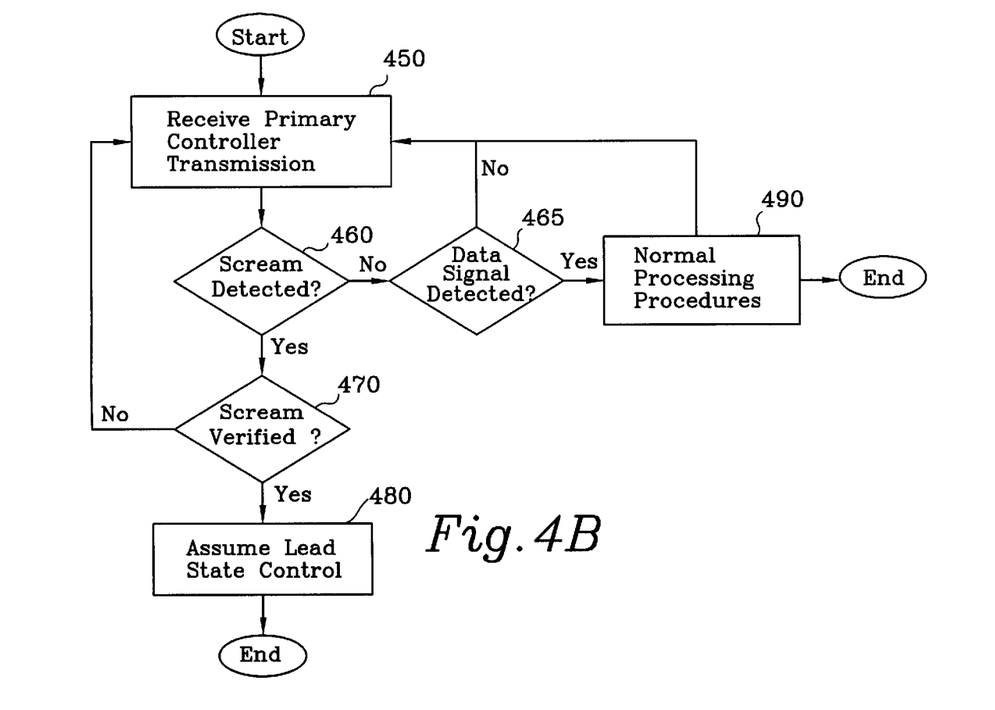
FIG. 4B illustrates a flow block diagram of one embodiment of an exemplary method of detection by a secondary controller through firmware routines and transmission through the inter-connectivity of the dual redundant controllers of a failure notification received from a primary controller.

Turning now to FIG. 4A and FIG. 4B, illustrated are contemporaneous flow diagrams (collectively generally designated 400) of one embodiment of data signal generation and/or scream generation from the primary controller 301 and data signal detection and/or scream detection by the secondary controller 302, respectively.

FIG. 4A illustrates a flow block diagram of one embodiment of an exemplary method of a failure notification signal generation by the primary controller 301 through hardware or software such as firmware routines and transmission through the device inter-connectivity of the dual redundant controllers such failure to the secondary controller 302. For purposes of speed and fault coverage, this failure notification signal generation logic may preferably be implemented in hardware. In the illustrated embodiment, the primary controller 301 continuously polls or tests the primary controller system (in a block 410) to determine whether a failure condition has been detected (in a block 420) creating the necessity for generation of a scream (in a block 421). The scream signal could be generated upon detection of failure conditions, such as the following: at the firmware's direction as in the failure detection of the primary controller processor 310, after a watchdog time-out occurs, upon a memory fault and/or upon a loss of power from either the primary controller processor power source 311 or the primary controller scream power source 312. While firmware executed by the primary controller processor 310 may cause a scream signal to be generated, hardware external to the primary controller processor 310 but still considered part of the primary controller processor 310 may also trigger a scream signal to be generated. Additionally, a scream signal generation does not necessarily require any software action.

If none of the predetermined device failure conditions exists, a scream is not generated, normal data processing continues and the data signal sequence generation occurs (in a block 430). The data signal is processed and transmitted (in a block 440) to the secondary controller 302. To support signal detection (in a block 465), a data signal sequence (in a block 430) would include actual data or an idle pattern. If a predetermined device failure condition is detected, a scream is immediately generated and transmitted by the primary controller 301 to the secondary controller 302.

The data signal and/or scream patterns are processed and transmitted (in the block 440) to the secondary controller 302. When signal detection and scream sequences are combined, they provide a method for a device to distinguish between the device failure and an inter-device communications failure. Refer to the following truth table interpretation for an exemplary combination method:

| Signal Detect | Scream | Failure |
| --- | --- | --- |
| Signal | Quiet | None |
| No signal | Quiet | Communications Link Failure |
| (Don't care) | Scream | Device Failure |

When criteria for a scream are met, the firmware from the primary controller scream source generator 313 can generate the scream as a unique information sequence. The scream pattern can be defined in such a way that the scream pattern is not confused with normal data patterns by using characters that differ from normal data patterns. A scream could be processed in the following exemplary way:

given a 10-bit data character,
txxxxxxxxp
where, t=a pattern type,
x=a data bit and
p=a parity bit.

If t=0, the character is processed as data. If t=1, the character is processed as a scream. To add additional security, a data bit pattern could be required to be either a unique but fixed pattern or to be a series of changing patterns that follows a sequence known to both the sender, the primary controller 301, and the receiver, the secondary controller 302.

Once the primary controller scream is generated (in the block 421), it is transmitted to the secondary controller 302. Once the scream signal is generated, continuous screams are processed and transmitted until such time that the screams can no longer be generated. In addition to scream generation, the primary controller relinquishes lead state control (in a block 423).

Contemporaneously with FIG. 4A, FIG. 4B illustrates a flow block diagram of one embodiment of an exemplary method of detection by a secondary controller through hardware and/or firmware routines and transmission through the inter-connectivity of the dual redundant controllers of a failure notification received from a primary controller. Initially, the secondary controller 302 receives the primary controller transmission (in a block 450). Once the secondary controller 302 receives the transmission, the secondary controller then decodes the data received. The secondary controller 302 determines if a scream has been detected (in a block 460). If a scream sequence is not detected, the secondary controller 302 then determines if there is a signal detection (in a block 465). If a scream sequence is not detected and a transmission signal is instead detected, normal processing procedures occur within the secondary controller (in a block 490). If neither a transmission signal nor a scream is detected, the secondary controller 302 may assume that a communications failure exists and may wait to receive a transmission from the primary controller 301.

If a scream sequence is detected, the secondary controller 302 monitors and verifies that the scream is valid (in a block 470) by looking for the predefined unique scream characters in the predetermined pattern for at least the minimum number of predetermined repetitions or for a predetermined period of time. If the scream sequence is not verified, the secondary controller returns to receive a primary controller transmission. In the event the scream sequence is validated, the secondary controller 302 then initiates and asserts lead-state control (in a block 480) for that part or all of the process system, as the case may be.

From the above, it is apparent that the present invention provides, for use in a control system containing first and second devices coupled together for inter-device communication, a circuit for and method of distinguishing a failure of the first device from a failure of the inter-device communication and a real-time process control system employing the circuit or the method. In one embodiment, the circuit includes: (1) a device failure signal generator, associated with and separately powered from the first device, that communicates a device failure signal to the second device upon occurrence of a predetermined condition and (2) a device failure signal detector, associated with the second device, that detects the device failure signal, detection of the device failure signal contraindicating a failure of the inter-device communication signal.

Although the present invention and its advantages have been described in detail, those skilled in the art should understand that they can make various changes, substitutions and alterations herein without departing from the spirit and scope of the invention in its broadest form.

What is claimed is:

1. For use in a control system containing first and second devices coupled together for inter-device communication, a circuit for distinguishing a failure of said first device from a failure of said inter-device communication, comprising:
   a device failure signal generator, associated with and separately powered from said first device, that communicates a device failure signal to said second device upon occurrence of a predetermined condition; and
   a device failure signal detector, associated with said second device, that detects said device failure signal, detection of said device failure signal contraindicating a failure of said inter-device communication.

2. The circuit as recited in claim 1 wherein said first and second devices are primary and secondary controllers of said control system, respectively.

3. The circuit as recited in claim 1 wherein said predetermined condition is a loss of power to said first device.

4. The circuit as recited in claim 1 wherein said predetermined condition is receipt of a selected one of:
   a hardware command,
   a software command, and
   a signal generated by hardware external to a processor that monitors system integrity.

5. The circuit as recited in claim 1 wherein said device failure signal contains a predetermined data pattern.

6. The circuit as recited in claim 1 wherein said device failure signal generator is powered by a power supply that derives power from a power supply of said first device.

7. The circuit as recited in claim 1 wherein said inter-device communication occurs over a selected one of:
   an electrical conductor, and
   an optical fiber.

8. For use in a control system containing first and second devices coupled together for inter-device communication, a method of distinguishing a failure of said first device from a failure of said inter-device communication, comprising the steps of:
   communicating, with a device failure signal generator associated with and separately powered from said first device, a device failure signal to said second device upon occurrence of a predetermined condition; and
   detecting said device failure signal at said second device, detection of said device failure signal contraindicating a failure of said inter-device communication.

9. The method as recited in claim 8 wherein said first and second devices are primary and secondary controllers of said control system, respectively.

10. The method as recited in claim 8 wherein said step of communicating is carried out upon a loss of power to said first device.

11. The method as recited in claim 8 wherein said step of communicating is carried out upon receipt of a selected one of:
    a hardware command,
    a software command, and
    a signal generated by hardware external to a processor that monitors system integrity.

12. The method as recited in claim 8 wherein said device failure signal contains a predetermined data pattern.

13. The method as recited in claim 8 wherein said device failure signal generator is powered by a power supply that derives power from a power supply of said first device.

14. The method as recited in claim 8 wherein said step of communicating comprises the step of transmitting said device failure signal over a selected one of:
    an electrical conductor, and
    an optical fiber.

15. A real-time process control system, comprising:
    a primary controller that controls said system;
    a secondary controller that assumes control of said system upon failure of said primary controller;
    a communication channel coupling said primary and secondary controllers that allows said primary and secondary controllers to communicate; and
    a circuit for distinguishing a failure of said primary controller from a failure of said communication channel, including:
       a device failure signal generator, associated with and separately powered from said primary controller, that communicates a device failure signal to said secondary controller upon occurrence of a predetermined condition, and
       a device failure signal detector, associated with said secondary controller, that detects said device failure signal, detection of said device failure signal contraindicating a failure of said communication channel and prompting said secondary controller to assume said control of said system.

16. The system as recited in claim 15 wherein said predetermined condition is a loss of power to said primary controller.

17. The system as recited in claim 15 wherein said predetermined condition is receipt of a selected one of:

a hardware command, a software command, and a signal generated by hardware external to a processor that monitors system integrity.

18. The system as recited in claim 15 wherein said device failure signal contains a predetermined data pattern.

19. The system as recited in claim 15 wherein said device failure signal generator is powered by a power supply that derives power from a power supply of said primary controller.

20. The system as recited in claim 15 wherein said communication channel is over a selected one of:

an electrical conductor, and an optical fiber.

* * * * *